United States Patent [19]

Beller

[11] 4,442,763

[45] Apr. 17, 1984

[54] MEAT ROASTER

[75] Inventor: Frank W. Beller, Aurora, Ill.

[73] Assignee: Belson Manufacturing Co., Inc., North Aurora, Ill.

[21] Appl. No.: 456,830

[22] Filed: Jan. 10, 1983

[51] Int. Cl.$^3$ .............................................. A47J 43/18
[52] U.S. Cl. ....................................... 99/427; 99/401;
 99/421 HV; 99/447; 99/449; 126/9 B
[58] Field of Search ............. 99/393, 447, 401, 421 R,
 99/421 H, 427, 449, 443 R, 421 HV; 126/9 B,
 41 B

[56] References Cited

U.S. PATENT DOCUMENTS

| | | | |
|---|---|---|---|
| 2,811,099 | 10/1957 | McGoldrick | 99/421 H |
| 2,826,981 | 3/1958 | Chick . | |
| 3,103,161 | 9/1963 | Whitehead . | |
| 3,363,543 | 1/1968 | Roberts et al. . | |
| 3,769,901 | 11/1973 | Phillips . | |
| 3,811,374 | 5/1974 | Mann | 99/449 X |
| 4,165,683 | 8/1979 | Van Gilst . | |

FOREIGN PATENT DOCUMENTS 584024 1/1977 Switzerland ...................... 99/421 H

*Primary Examiner*—Billy J. Wilhite
*Attorney, Agent, or Firm*—Lee, Smith & Zickert

[57] ABSTRACT

A meat roaster with skeleton support which is free standing, capable of quick assembly and is adapted to be fully enclosed by sheet or foil-type metal for cooking large food items. The skeleton support comprises lower, intermediate and upper frame means. The intermediate frame means includes means for rotationally supporting a wide variety of spit basket styles and means for adjusting the height of the spit basket. The upper frame means includes opposing hoop-like members interconnected by a longitudinal support which cooperate to form a dome-shaped ceiling when enclosed. A firebox chamber is formed below the dome-shaped ceiling by enclosing the intermediate frame means. The upper frame means is manually disengageable from the intermediate frame means allowing access to the food during roasting. The lower frame means is capable of supporting charcoal baskets in the firebox chamber below and to the sides of a supported spit basket. The frame means are capable of full disassembly.

7 Claims, 4 Drawing Figures

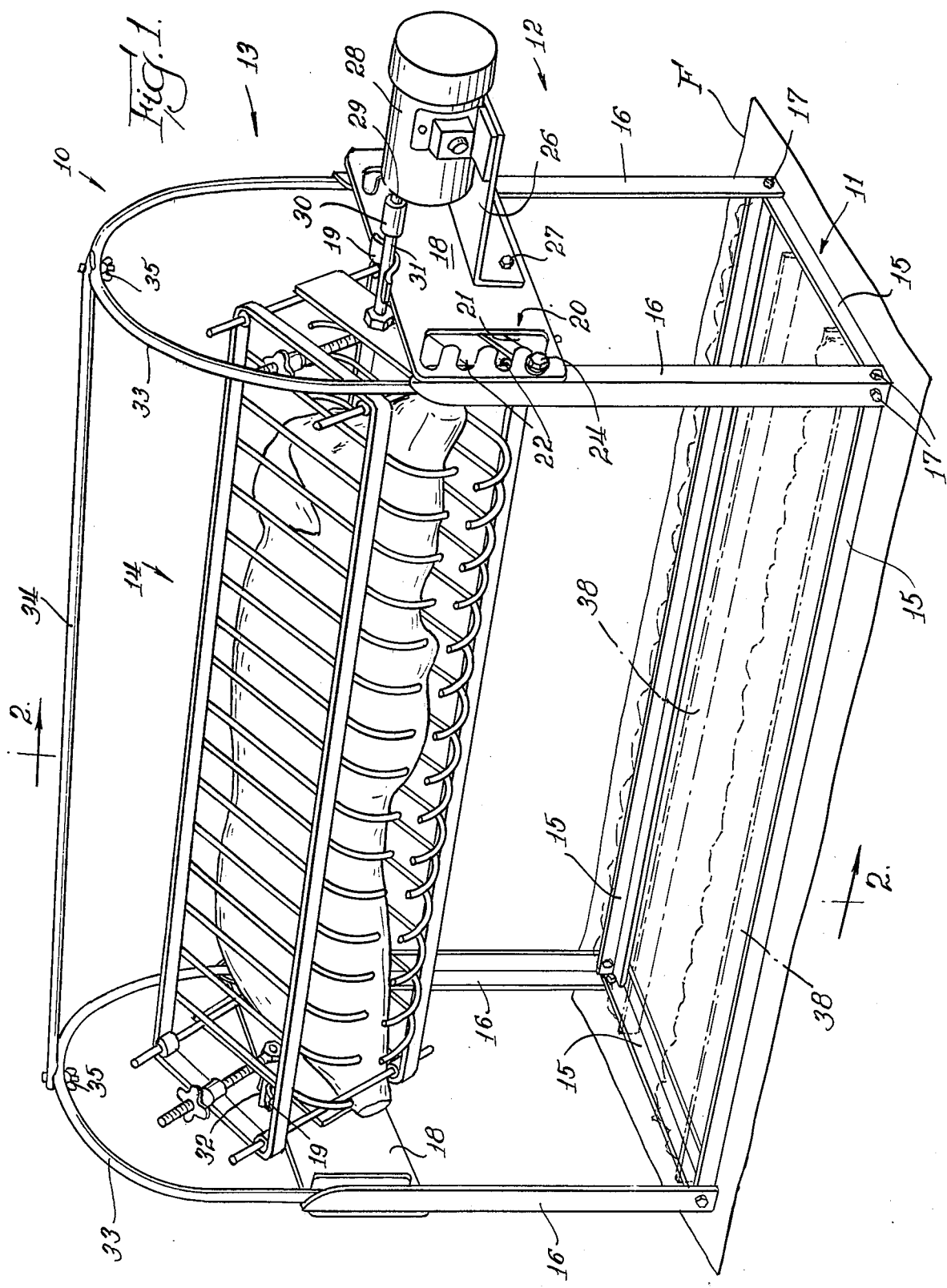

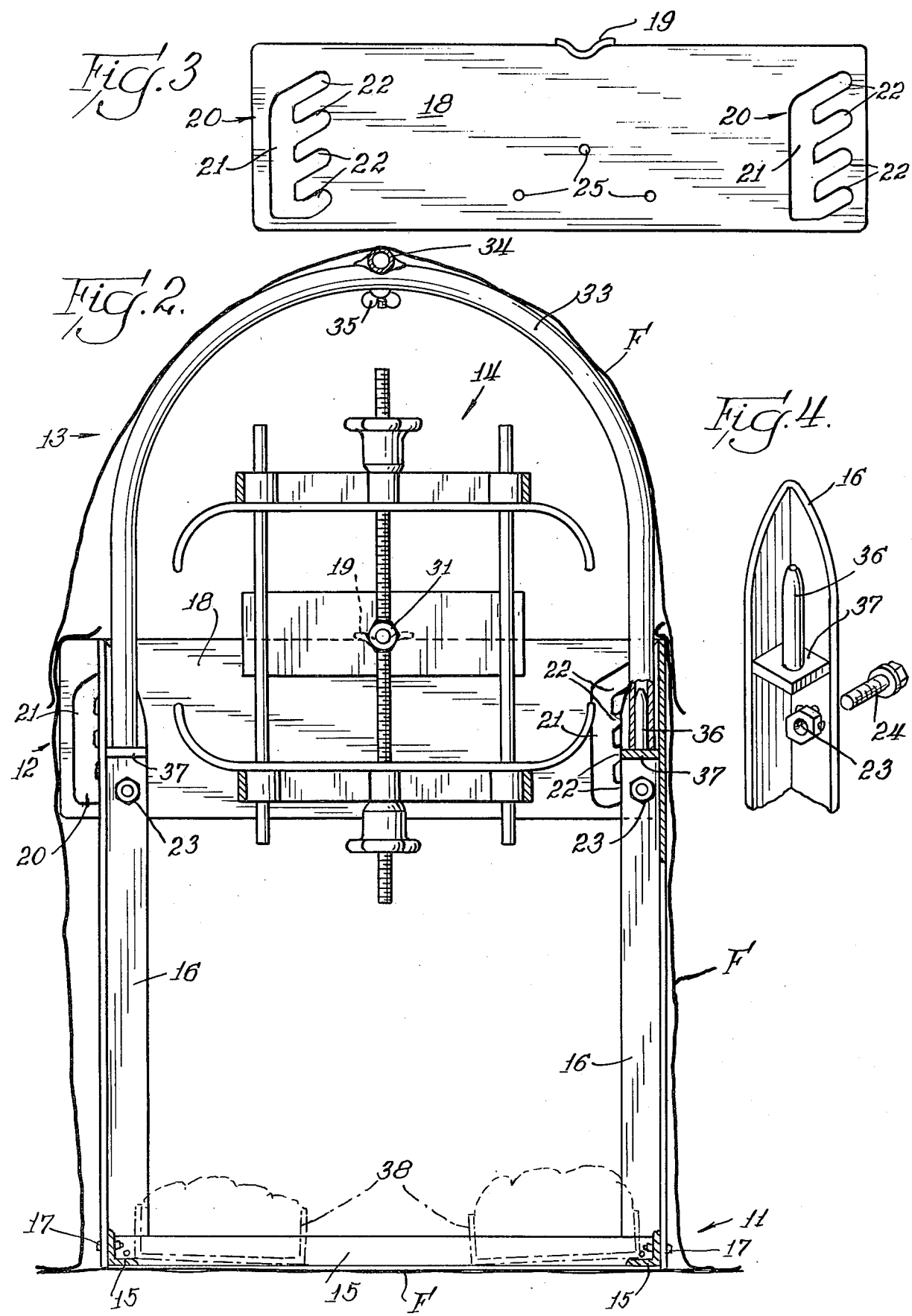

MEAT ROASTER

BACKGROUND AND SUMMARY OF THE INVENTION

The present disclosure is directed toward a large volume meat roaster with skeleton support for use with a variety of different spit baskets and intended to be covered by sheet, or foil-type, metal covering for roasting.

in roasting large volumes of meat, for example a pig, a spit is generally used which may be rotated by hand or by means of a rotisserie motor. A wide variety of makeshift outdoor ovens have been utilized and primarily they involve improvised rudimentary spit basket structures. For example, chicken wire has been used to encase a whole pig around a metal spit rod for securing it during roasting. Some sophisticated spit structures have been developed, particularly in the last 30 years, for electric indoor/outdoor rotisserie devices for small food items. One effective free standing outdoor meat roaster, with a novel spit basket, is disclosed in my co-pending U. S. patent application Ser. No. 357,330. My co-pending application discloses a meat roaster having a firebox and domed lid for roasting large items.

It has been found that consumers desire yet another type of roasting device which allows them to use a variety of spit baskets, from the sophisticated to the homemade, and which further permits the use of a simple foil covering for enclosing the structure. Present free standing devices are relatively large and have not been capable of easy disassembly, although they may be lightweight and portable. The ability to disassemble a roaster for storage and transport to another site is also a desired feature. A free standing roaster, such as disclosed in co-pending application, includes a permanent covering, namely heat resistant sheet metal, for the firebox and domed lid. While it may be easily lifted it is not capable of storage in small quarters.

Accordingly, an object of the present invention is to provide a meat roaster with skeleton support whereby a wide variety of spit baskets may be rotationally supported therein.

In addition to the foregoing goal, it is an object of the invention to provide a skeleton support which is adaptable for enclosure with lightweight sheet metal or foil material after assembly, which combines with the skeleton to form a roaster in which large food items may be accommodated on a spit supported therein.

It is further an object of the invention to provide a food roaster with skeleton support that has easily disengaged mechanical fastening to render it portable and capable of being stored in a small space, for example in the trunk of a car before and after use.

It is an additional object of the invention to provide a meat roaster with skeleton support wherein an upper frame is supported by, but not mechanically fastened to, an intermediate frame of the the skeleton in order to permit access to the food while it is roasting. This feature allows the cook to perform seasoning, basting and other culinary operations.

The invention satisfies these needs and may be summarized as providing a skeleton support for a meat roaster having generally rectangular lower frame means capable of holding charcoal baskets and supporting the skeleton on a planar surface. An intermediate frame means is fastened at cornerposts thereof to, and extending upwardly from, the lower frame means. The intermediate frame means has opposing end plate members which include bearing seats for rotationally supporting a spit basket and means for adjusting the height of the spit relative to the charcoal. The intermediate frame means further comprises support means for a rotisserie motor. The upper frame means includes opposing hoop-shaped tubular members supported therebetween by a longitudinal member. The hoop-shaped members are slide engageable with upright pins located on the cornerposts of the intermediate frame means to permit the removal of the upper frame means, which is particularly useful during roasting. The upper frame means, when covered with sheet metal or metal foil, forms a dome-like upper ceiling to the roaster. The intermediate frame means may be similarly covered to form a four- wall firebox below the dome-shaped ceiling. This arrangement causes rising heat to circulate around the spit and back downwardly to evenly heat the item to be cooked.

The lower and upper frame means are fastened together at said cornerposts with removable mechanical fasteners. Furthermore, the members forming the lower, intermediate and upper frame means are assembled with removable mechanical fasteners facilitating complete disassembly for storage.

BRIEF DESCRIPTION OF THE DRAWINGS

Further objects and features of the present invention will become apparent from the following description of an illustrative embodiment thereof, taken in conjunction with the following drawings, in which:

FIG. 1 is a perspective view of the meat roaster with skeleton support embodying the best mode of the invention and shown with a spit basket rotationally supported therein and having covering material removed for purposes of illustration;

FIG. 2 is a cross-sectional view taken at line 2—2 of FIG. 1 with the inclusion of foil wrapping about the skeleton support;

FIG. 3 is a front view of an end plate member of the intermediate frame means; and, FIG. 4 is a perspective view of the top portion of one cornerpost member of the intermediate frame means for supporting the upper frame.

DESCRIPTION OF EXAMPLE EMBODYING BEST MODE OF THE INVENTION

A roaster 10 with skeleton support is disclosed for rotationally supporting a spit basket and capable of being covered by a foil wrapping, or the like, which makes roasting large meat items possible. Roaster 10 is further disclosed to be capable of rotationally supporting a variety of spit basket styles and as providing means for coupling a spit basket to a rotisserie motor.

The skeleton support of meat roaster 10 comprises a lower frame 11, intermediate frame 12 and upper frame 13. Lower frame 11 is the supporting base of the skeleton and comprises members 15, which are L-angled in section, and are arranged so that two long members oppose and two short members oppose. The long and short members 15 meet each other at their ends to form a rectangular configuration. At each corner of the rectangle, the shorter and longer members 15 are removably fastened to lower ends of vertically positioned cornerposts 16 of intermediate frame 12. Cornerposts 16 comprise upright supports for the skeleton. Conventional nut and bolt mechanical fasteners 17 disengagably connect the members 15 to cornerposts 16.

Adjacent their upper ends, the cornerposts 16 are connected across the shorter ends of the rectangular shape by end plates 18 which provide means for supporting a spit basket and rotisserie motor. With particular reference to FIG. 3, it will be seen that end plates 18 have a saddle 19 offering bearing support for a spit basket shaft. Saddle-shaped bearing supports 19 are disclosed as weld engaged to each end plate 18 at a notch centrally positioned along the upper edge thereof. Bearing supports 19 are in axial alignment to dispose spit basket 14 lengthwise and centered within the skeleton frame.

Intermediate frame 12 includes means for spit height adjustment by the cooperation of comb-shaped apertures 20 with welded nuts 23 and washer-head bolts 24. Comb-shaped apertures 20, are formed in end plates 18 and comprise vertical slots 21 having a continuous boundary with a plurality of inclined notches 22. Two apertures 20 are provided at the same relative locations on each end plate 18 and the inclined notches 22 of both end plates open toward the same direction.

The end plates 18 are movably secured to exterior surfaces of the cornerposts 16. The securement is provided by the welded nuts 23 being thread-engaged by the washer-head bolts 24. Nuts 23 are fixedly engaged along interior surfaces of the cornerposts in positional correspondence with holes through the cornerposts (not shown). The washer-head bolts 24 pass through apertures 20 and cornerpost holes for thread engagement with the stationary nuts 23. The locations of the welded nuts 23 are all at the same height. Bolts 24 support end plates 18 by extending through notches 22 of the apertures 20, as shown in FIG. 1. The plurality of inclined notches 22 at each aperture 20 provides alternate supporting levels for engagement by bolts 24. Thus, the elevation of end plates 18 can vary from level to level. In the embodiment shown, apertures 20 of the opposing end plates are mirror images and accordingly the notches of all four apertures 20 vertically correspond to permit the end plates to be evenly supported at the same elevation. Since the notches all open toward the same direction, when bolts 24 are partially unthreaded both end plates may be simultaneously shifted in substantially the same motion to re-position the bolts into another set of corresponding notches. Specifically the height adjustment is accomplished by first translating the end plates sideways to dispose bolts 24 within vertical slots 21. Then, the end plates may be freely raised or lowered since the bolts encounter no obstructions in the vertical direction while disposed within slot 21. When the corresponding notches at the new elevation are positioned opposite their respective bolts 24, sideway translation in the opposite direction is made to re-engage the notches 22 with bolts 24 at this new height. The bolts 24 are then tightened for securement of the end plates. This adjustment feature of the invention may be accomplished while the spit basket is supported by saddles 19. If the food item is particularly heavy, the spit basket may be temporarily lifted upwardly, free of saddles 19, while the end plates are repositioned to the new elevation. By affording spit height adjustment, the user can vary the proximity of the heat source to the food, so that desired roasting temperatures and conditions can be maintained.

Intermediate frame 12 further includes means for supporting a rotisserie motor which comprises mounting holes 25 through an end plate to facilitate fastening a motor bracket 26 to the end plate. Bracket 26 is mechanically fastened by bolts 27. Just one end plate 18 may have mounting holes 25, but both may include mounting holes in order to permit alternate mounting of motor bracket 26 at either end of the roaster. Bracket 26 is generally L-shaped having one flange of the L extending at right angles to end plate 18 and forming a support surface for rotisserie motor 28. The other, or vertical, flange of the L is affixed by the fasteners 27 to an end plate 18. Motor 28 is of conventional design and provides continuous spit rotation. Motor drive shaft 29 communicates with spit basket 14 by means of coupler 30 engaging a shaft 31 of the basket. At the other end, basket 14 includes a free shaft 32 rotationally supported by bearing saddle 19 at the opposite end plate 18. Thus, a variety of spit structures can be accommodated. Shafts extending from the ends of the spits may be supportively positioned at saddles 19 in substantially the same manner as with basket 14.

It will be understood that should manual rotation be desired, motor 28 and bracket 26 can be eliminated and a simple handle may by coupled to shaft 31 for this purpose.

Upper frame 13 comprises opposing tubular hooplike members 33 supportively communicating with cornerposts 16 at the opposite shorter sides of the roaster. A longitudinal support member 35 extends lengthwise of the roaster, generally centered above spit basket 14, and is disengageably secured to the tops of the hooplike members 33 by conventional wing nut and screw fasteners 35. Tubular hoops 33 removably engage support portions of corner posts 16. As shown in FIG. 4, located slightly below the upper ends of each cornerpost, an upright pin 36 is weld-engaged to a horizontal base 37. Base 37 is preferably fixed, such as by welding, to the cornerposts. Upright pins 36 have a slightly smaller width than the inside dimension of tubular hoops 33 to permit sliding insertion. When fully inserted, base 37 suports the ends of hoops, as shown in FIG. 2. Upper frame 13 is thereby rendered fully removable from intermediate frame 12 without requiring disengagement of mechanical fasteners. This offers a large benefit to the user during cooking operations when access to the food and spit basket is desired, such as for the purpose of basting or seasoning a roast.

In operation, charcoal baskets 38 are disposed lengthwise in the roaster, to the sides of spit basket 14, and are supported by members 15 of lower frame 11. It has been found very effective to place the baskets to the sides of the spit in order to prevent grease drippings from falling on the charcoal and causing flare-ups. Also, rising heat is directed around the spit to afford more even cooking temperatures and reduce hot spots. As shown in FIG. 2 of the disclosed embodiment, aluminum foil F is placed around upper frame 13 forming a dome-shaped ceiling which is closed at opposite ends by covering hoops 33. Foil is also placed around the four cornerposts of intermediate frame 12 which forms a four-wall firebox chamber and completes full coverage of roaster 10. in addition, a sheet of aluminum foil F may be initially disposed beneath lower frame 11 to prevent any grease drippings or spillage from contacting the supporting surface below. The use of aluminum foil F is exemplary, and users may choose their own covering. One alternative is considered to be lightweight sheet metal that can be bent or folded to the conforming shape for enclosure of the roaster. When covered, and in use, heat flows upwardly from the charcoal baskets 38 and is directed to circulate around and below spit basket 14 for even cooking. The dome-shaped ceiling, created by enclosing upper frame 13, directs the upward flow over the spit, and then re-directs the flow back downwardly to the sides and bottom of the spit to effeciently mix and meet the initially rising heat flow. Continuous rotation provided by rotisserie motor 30 further aids in achieving the even cooking temperatures desirable for large meat items, such as a whole pig. After cooking is through, upper frame 13 may be simply lifted upwardly from intermediate frame 12 to grant access to the spit basket 14. Carving can then take place with the spit basket remaining in place. For removal of the spit, coupler 30 is disengaged and by grasping shafts 31-32, spit basket 14 may be lifted from the skeleton support. After cooking procedures are done, the mechanical unfastening of the frame components may then take place, rendering the disconnected components ready for compact storage and reassembly at another time.

ACHIEVEMENTS OF THE INVENTION

The invention provides a meat roaster with skeleton support that may be assembled and disassembled with ease. The frame support provides lower, intermediate and upper frames which are mechanically fastened in a removable manner. The meat roaster disclosed provides bearing supports for use with many different types of spit baskets. Spit basket 14, which is described in my co-pending U.S. patent application Ser. No. 357,330, is one type suitable for use. The intermediate frame affords means for adjusting the height of the spit relative to a heat source supported by the lower frame. Foil covering may easily be draped or wrapped to cover the skeleton support and provide a very efficient roaster for large food items. Means for mounting a rotisserie motor is available, but it is optional and can be eliminated when manual rotation is desired. The meat roaster with skeleton support is portable, lightweight and capable of full dissassembly for compact storage.

What is claimed is:

1. A framework for a meat roaster, generally rectangular in plan and capable of rotationally supporting spit basket means, being adapted for enclosure by sheet-like metal and capable of accommodating a heating source below the spit basket means, the framework provides means for mounting a rotisserie motor in driving relationship with a spit basket means, said framework comprising:

lower frame means providing a framework support base and being generally rectangular in plan;

intermediate frame means associating with and supported by said lower frame means, including vertical cornerpost members disengageably fastened to said lower frame means at corners of the rectangle, opposing end plate members supported generally above opposite shorter sides of the rectangular lower frame means and means for releasably fastening said end plate members to said cornerpost members, said end plate members having longitudinally aligned bearing support means capable of supporting a spit basket means lengthwise in the framework and having means for supporting a rotisserie motor in driving relationship with a spit basket means, and said cornerpost members further including disengageable support means adjacent upper ends thereof;

upper frame means including opposite hoop-like members spanning across said intermediate frame means and removably supported at said disengageable support means of the cornerpost, members a longitudinal support member extending lengthwise of said framework and having opposite ends disengageably fastened to said hoop-like members;

whereby said intermediate frame means is adapted to be enclosed by sheet-like metal to form a four-wall firebox chamber, wherein charcoal baskets may be supported lengthwise by said lower frame means below and to the sides of a spit basket means, wherein said upper frame means is adpated to be enclosed by sheet-like metal forming a dome-shaped ceiling over said firebox chamber, and thereby said framework is capable of being completely enclosed forming a free standing, portable meat roaster, capable of disassembly.

2. A framework for a meat roaster as in claim 1 wherein said means for releasably fastening the end plate members to said cornerpost members is capable of adjustment to at least two vertical positions whereby the vertical spacing between the end plate members and lower frame means may be varied.

3. A framework for a meat roaster as in claim 2 wherein said releasably fastening means comprises comb-shaped apertures through said end plate members, the end plate members supportively associating with mechanical fasteners extending through said apertures and disengageably communicating with said cornerpost members.

4. A framework for a meat roaster as in claim 3 wherein said end plate members each include a pair of said comb-shaped apertures, the apertures having a vertical slot communicating with a plurality of vertically spaced inclined notches, wherein the inclined notches of the apertures are oriented in the same direction.

5. A framework for a meat roaster as in claim 1 wherein said disengageable support means adjacent upper ends of said corner post members comprise pin members.

6. A framework for a meat roaster as in claim 5 wherein the opposite hoop-like members of said upper frame means are tubular and capable of slide-engaging the pin members at opposite ends of the tubes wherein said upper frame means is capable of slide-disengaging said pin members permitting access to a supported spit basket.

7. A framework for a meat roaster as in claim 1 wherein the means for supporting a rotisserie motor comprises a mounting bracket member fastened to an end plate member, and includes a horizontal support surface extending framework-outwardly for mounting a rotisserie motor thereon.

* * * * *